(12) United States Patent
Zhou et al.

(10) Patent No.: US 9,137,684 B2
(45) Date of Patent: Sep. 15, 2015

(54) METHOD AND SYSTEM ARCHITECTURE FOR A SELF ORGANIZING NETWORK

(75) Inventors: Fei Frank Zhou, Milpitas, CA (US);
Hanson On, Escondido, CA (US);
Zaijin Guan, San Diego, CA (US)

(73) Assignee: AIRHOP COMMUNICATIONS, INC., San Diego, CA (US)

( * ) Notice: Subject to any disclaimer, the term of this patent is extended or adjusted under 35 U.S.C. 154(b) by 416 days.

(21) Appl. No.: 13/092,140

(22) Filed: Apr. 21, 2011

(65) Prior Publication Data

US 2011/0261721 A1  Oct. 27, 2011

Related U.S. Application Data

(60) Provisional application No. 61/326,411, filed on Apr. 21, 2010.

(51) Int. Cl.
| | |
|---|---|
| *H04W 4/00* | (2009.01) |
| *H04B 15/00* | (2006.01) |
| *H04W 24/02* | (2009.01) |
| *H04W 16/32* | (2009.01) |
| *H04W 72/12* | (2009.01) |

(52) U.S. Cl.
CPC .............. *H04W 24/02* (2013.01); *H04W 16/32* (2013.01); *H04W 72/1205* (2013.01)

(58) Field of Classification Search
CPC ............ H04W 72/082; H04W 72/087; H04W 72/0446; H04W 84/18

USPC .................... 370/329, 332; 455/501
See application file for complete search history.

(56) References Cited

U.S. PATENT DOCUMENTS

| | | | |
|---|---|---|---|
| 2007/0086406 A1* | 4/2007 | Papasakellariou | 370/343 |
| 2009/0080386 A1* | 3/2009 | Yavuz et al. | 370/337 |
| 2009/0082027 A1* | 3/2009 | Yavuz et al. | 455/446 |
| 2009/0086861 A1* | 4/2009 | Yavuz et al. | 375/346 |
| 2009/0310558 A1* | 12/2009 | Koyanagi | 370/330 |
| 2010/0248728 A1* | 9/2010 | Sun et al. | 455/450 |
| 2010/0309866 A1* | 12/2010 | Katayama et al. | 370/329 |
| 2011/0081865 A1* | 4/2011 | Xiao et al. | 455/63.1 |
| 2012/0088517 A1* | 4/2012 | On et al. | 455/452.1 |

* cited by examiner

*Primary Examiner* — Man Phan
*Assistant Examiner* — Ryan Kavleski
(74) *Attorney, Agent, or Firm* — Hayes Soloway P.C.

(57) ABSTRACT

A method and system architecture for a self-organizing network (SON) includes a first cell having a first user equipment classifier for determining one of cell edge and cell central. The SON also includes a second cell having a second user equipment classifier for determining one of cell edge and cell central. The system architecture and method provide a first transmit time interval (TTI) schema for user equipment within the area of coverage associated with the first cell and a TTI schema for user equipment within the area of coverage associated with the second cell, the second TTI schema differing from the first TTI schema. The user equipment is classified as cell center or cell edge in dependence upon at least one of QoS requirement, geometry, periodic PSMM and CQI reports. The TTI schemas are used for "cell edge" user equipment by the respective cells.

14 Claims, 7 Drawing Sheets

METHOD AND SYSTEM ARCHITECTURE FOR A SELF ORGANIZING NETWORK

CROSS-REFERENCE TO RELATED APPLICATIONS

This application claims benefit of priority from U.S. Provisional Application No. 61/326,411, filed Apr. 21, 2010, which is hereby incorporated by reference in its entirety as if fully set forth.

FIELD OF INVENTION

The present invention relates to methods and system architectures for Self Organizing Network (SON) and is particularly concerned with wireless network performance that is subject to intercell interference.

BACKGROUND OF THE INVENTION

This section is not to be construed as reflecting an admission that any content herein is relevant prior art. Moreover, this section is not an indication of a search for relevant disclosures. All statements are based on available information and are not an admission as to their accuracy or correctness.

The explosive adoption of video-enabled wireless mobile devices has caused an explosion of data traffic and exposed the capacity constraints of conventional wireless network topology.

Conventional wireless network (e.g. cellular network) deployment requires careful planning to maximize frequency reuse, minimize coverage dead zones and minimize inter-cell interference etc. The deployment is labour intensive due to significant amount of measurements and field trials. To reduce the cost of deployment, many network operators deploy macro cells which provide larger coverage footprint and higher capacity. This approach works when the subscribers' service types are mainly conversational (i.e. voice), interactive (e.g. web browsing, instant messaging etc.) or low rate streaming. These are the typical service types for 2G (e.g. GSM) and early 3G (e.g. UMTS Release 99 and CDMA2000) cellular networks where macro cell provides adequate quality of service to fulfill majority subscriber's needs.

More subscribers demand for faster data service as the bit rate at the air interface increases with the advance of the wireless technology (i.e. 3.5G and 4G). One instance of 3.5G is HSPA. One example of 4G networks is LTE (3GPP Release 8 and beyond), another is WiMax (IEEE802.16e and beyond). Given the limited available spectrum, the capacity becomes a serious issue for conventional macro cell. The capacity issue has caused a shift in cellular network deployment paradigm from well partitioned large coverage macro cells to densely deployed smaller cells (e.g. picocell and ferntocell), many being added dynamically in non-fixed locations.

Today's SON (i.e. self configuration and provision) are not sufficient for densely deployed small cells to operate properly. SON capable of coordinating among neighboring cells on radio resource allocation is essential for densely deployed small cells to operate properly.

SUMMARY OF THE INVENTION

The present invention provides system architecture for a Self-organizing Network (SON) using Fractional Time Reuse (FTR) that can be applied, but not limited to, 3G/4G wireless cellular networks and beyond, as well as other wireless network.

In accordance with an aspect of the present invention there is provided a FTR SON system for optimizing the network performance (e.g. capacity, throughput, quality of service) by coordinating network elements in groups.

BRIEF DESCRIPTION OF THE DRAWINGS

The present invention will be further understood from the following detailed description with reference to the drawings in which.

DETAILED DESCRIPTION OF MODES OF PRACTICING THE DISCLOSURE

Figure 1:
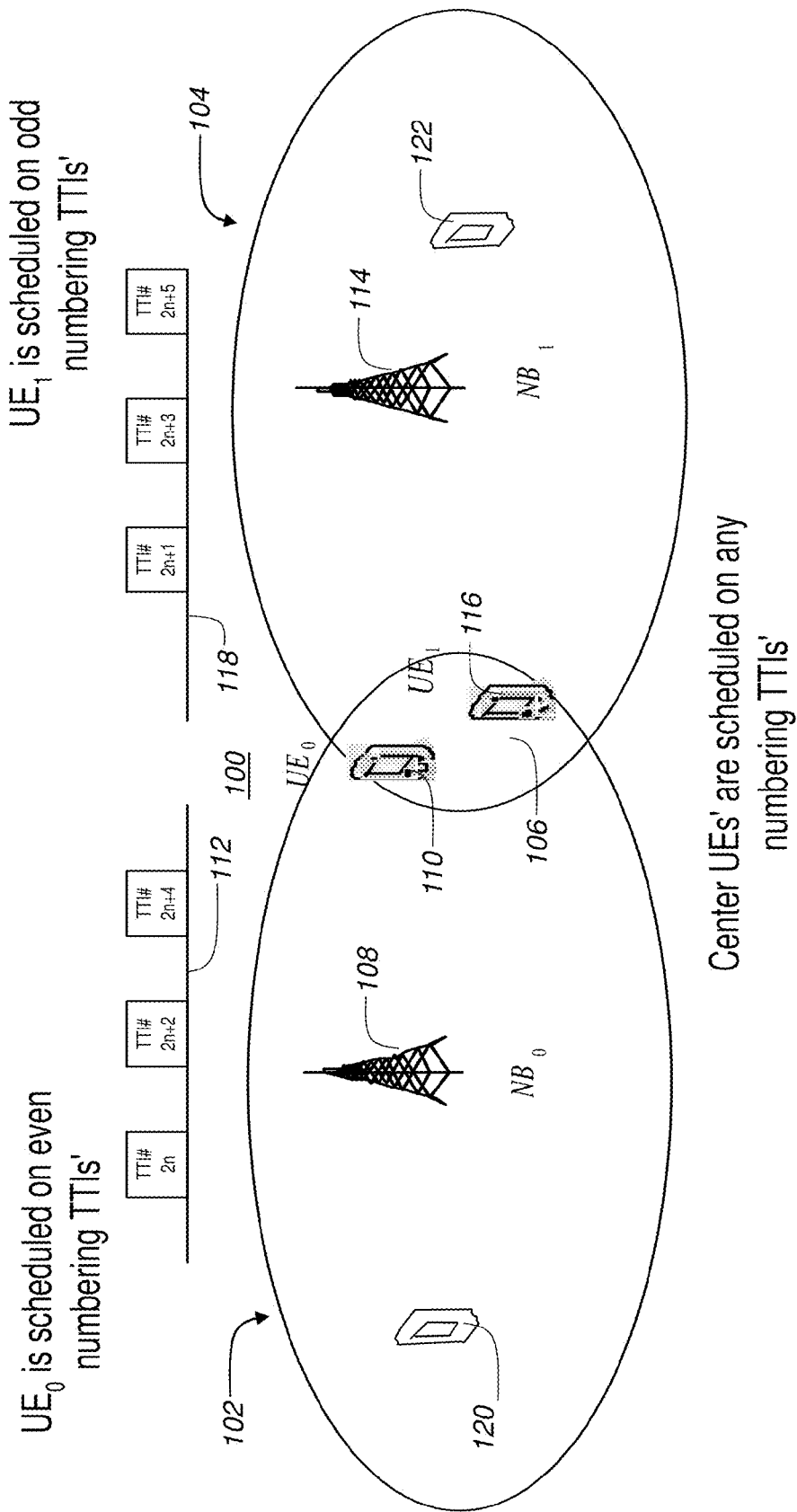
FIG. 1 illustrates Fractional Time Reuse (FTR) SON for Two-Cell Case.

Referring to FIG. 1 there is illustrated a fractional time reuse self-organizing network (FTR SON) operating in two-cell configuration that uses embodiments of the present invention. The FTR SON 100 includes a first cell 102 and a second cell 104, which have an overlapping region 106. The first cell 102 includes a first node 108 ($NodeB_0$) and a user equipment 110 ($UE_0$) in the overlapping area 106. The first node 108 uses a first fractional time reuse schema 112 to connect to the user element 110 ($UE_0$) when it is in the overlapping area 106. The second cell 104 includes a second node 114 ($NodeB_1$) and a user equipment 116 ($UE_1$) in the overlapping area 106. The second node 114 uses a second fractional time reuse schema 118 to connect to the user element 116 ($UE_1$) in the overlapping area 106.

In operation, assuming NBi is the serving Downlink Shared Channel (DSCH) NodeB for UEi, i=0, 1; where DSCH can be HS-DSCH for High Speed Packet Access (HSPA) or Physical Downlink Shared Channel (PDSCH) for Long Term Evolution (LTE), The FTR SON 100 puts long term scheduling restrictions onto the NodeB MAC scheduler such that the scheduling Time Transmission intervals (TTIs) (2 ms for HSPA, 1 ms for LTE) for UEs at the edge of the cells are staggered, e.g., in the two-cells case shown, $UE_0$ 110 is served on even numbering TTIs while $UE_1$ 116 is served on odd numbering TTIs. There is no restriction on the scheduling TTI timing for UEs 120 and 122 in the center of cells 102 and 104 respectively.

In the FTR SON 100, UEs can be classified as Center UEs, e.g. UE 120 and UE 122 or Edge UEs, e.g. UE 110 and UE 116 via PDP context Quality of Service (QoS) requirement, Geometry ($\hat{i}_{or}/I_{oc}$), Channel Quality Indicator (CQI), Pilot Strength Measurement Message (PSMM, Pilot Ec/Io), or similar SINR measurements performed at the UEs and reported to the NodeBs 108 and 114.

In a typical HSPA deployment, at least 50% NodeB power is allocated to HS-PDSCHs, staggering scheduling TTIs can significantly reduce Ioc, therefore improve cell edge UEs performance. Similar performance improvement can be expected for LTE.

Figure 2:
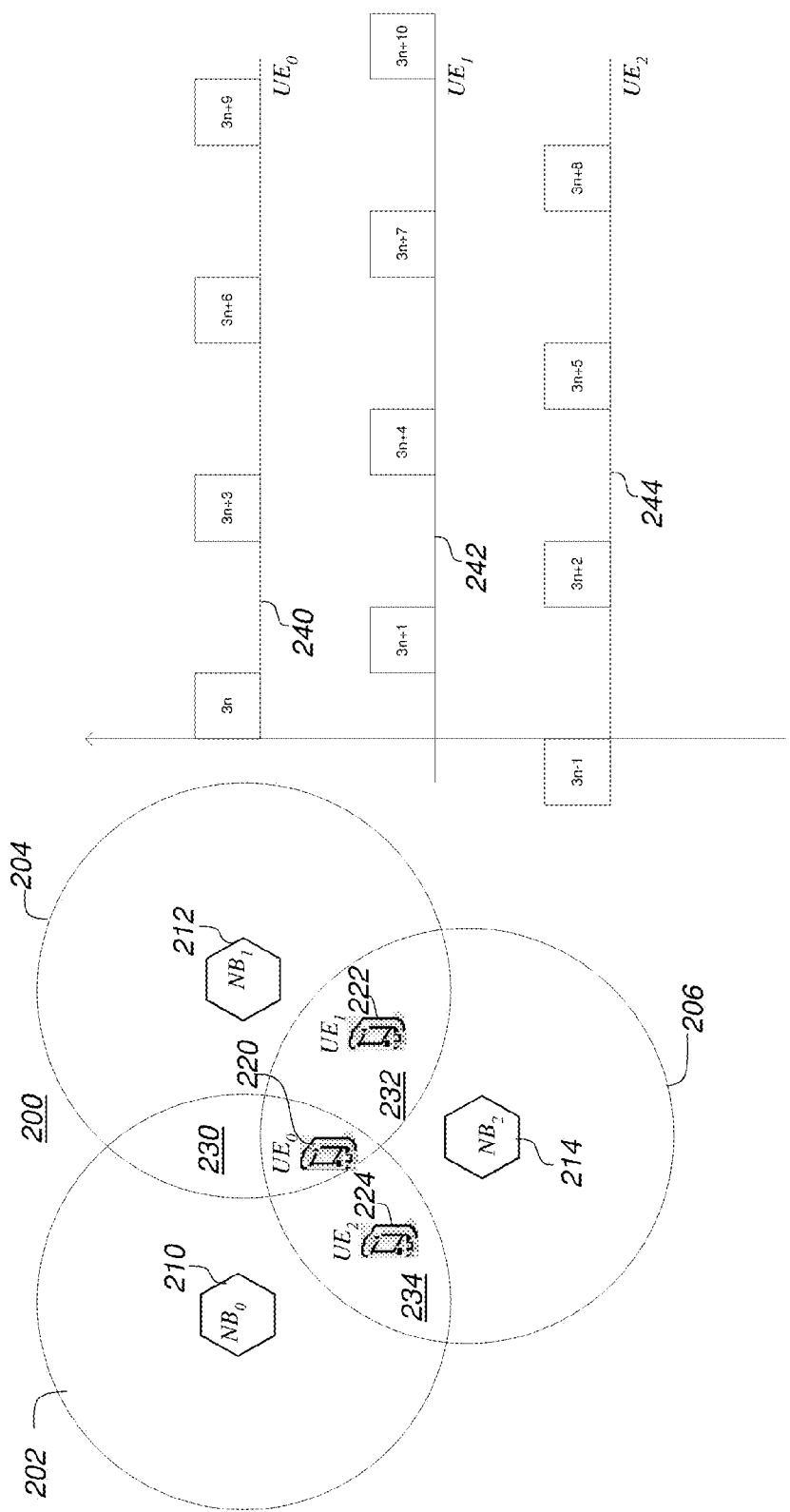
FIG. 2 illustrates FTR SON for Three-Cell Case.

Referring to FIG. 2 there is illustrated FTR SON for three-cell case. This is the generalization of the two-cell case in FIG. 1, which is significant since the entire network layer can be covered by grouping cells in groups of three. The three-cell FTR SON 200 includes cells 202, 204 and 206. Each cell 202, 204 and 206 has a respective NodeB, $NB_0$ 210, $NB_1$ 212 and $NB_2$ 214 in communication with a respective user equipment UE, $UE_0$ 220, $UE_1$ 222 and $UE_2$ 224.

In operation, in the example shown in FIG. 2, each $NB_i$ is the serving Downlink Shared Channel (DSCH) NodeB for $UE_i$, i=0, 1, 2. $UE_0$ 220 is interfered by $NB_1$ 212 and $NB_2$ 214, $UE_1$ 222 is interfered by $NB_2$ 214, $UE_2$ 224 is interfered by $NB_0$ 210. The FTR SON 200 puts a long term scheduling constrain onto NodeB MAC scheduler such that each $UE_i$ in service overlap areas 230, 232 and 234, is scheduled on TTIs numbered as 3 n+i, respectively, i=0, 1, 2, shown as 240, 242 and 244 respectively.

By staggering the Transmission Time Interval (TTI) for $UE_0$, $UE_1$, $UE_2$ intercell interference can be reduced considerably.

Figure 3:
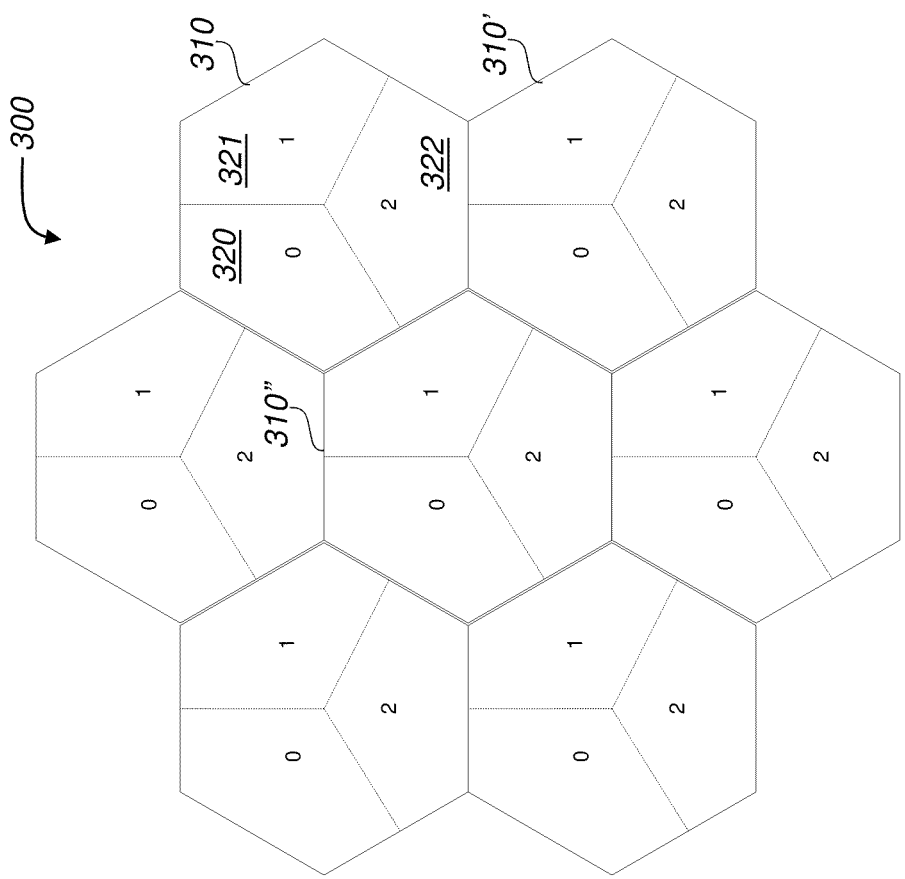
FIG. 3 illustrates FTR SON for Three-Cell Covering the Entire Layer of Network.

Referring to FIG. 3 there is illustrated the 3-cell grouping for covering an entire network layer with significantly reduced intercell interference at cell boundary. In the network 300, each cell 310 is divided into three sectors 320, 321 and 322, corresponding to I=0, 1, 2 as used in FIG. 2. Through this arrangement of Transmission Time Intervals (TTI) neighboring cells 310' and 310" each use a different TTI from their adjacent neighbor.

Figure 4:
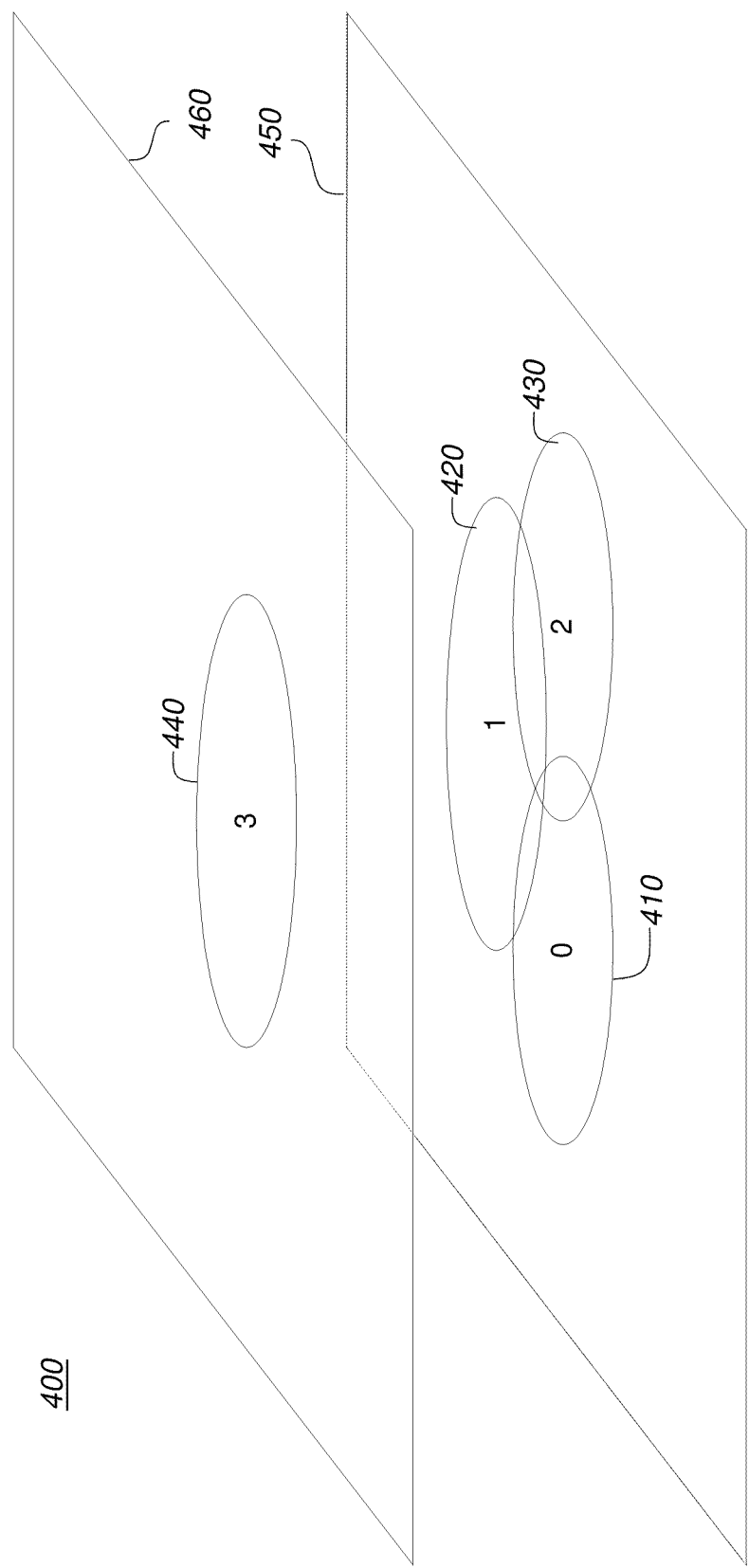
FIG. 4 illustrates FTR SON for Multi-Layer Network, e.g., Pico-cells in Multi-floor Office Building.

Referring to FIG. 4 there is illustrated FTR SON for a multi-layer network. The FTR SON 400 of FIG. 4, can be used, for example for pico-cells in a multi-floor office building. The example FTR SON 400 shown includes four cells, 410, 420, 430 and 440 in two layers 450 and 460. Hence, the FTR SON 400 is in the form of 4 n, 4 n+1, 4 n+2, and 4 n+3 can be applied. In general, an FTR SON in the form of M*n, . . . , M*n+(M−1), where M in the Fractional Time Reuse Factor, is used when M cells are grouped together for optimization.

Figure 5:
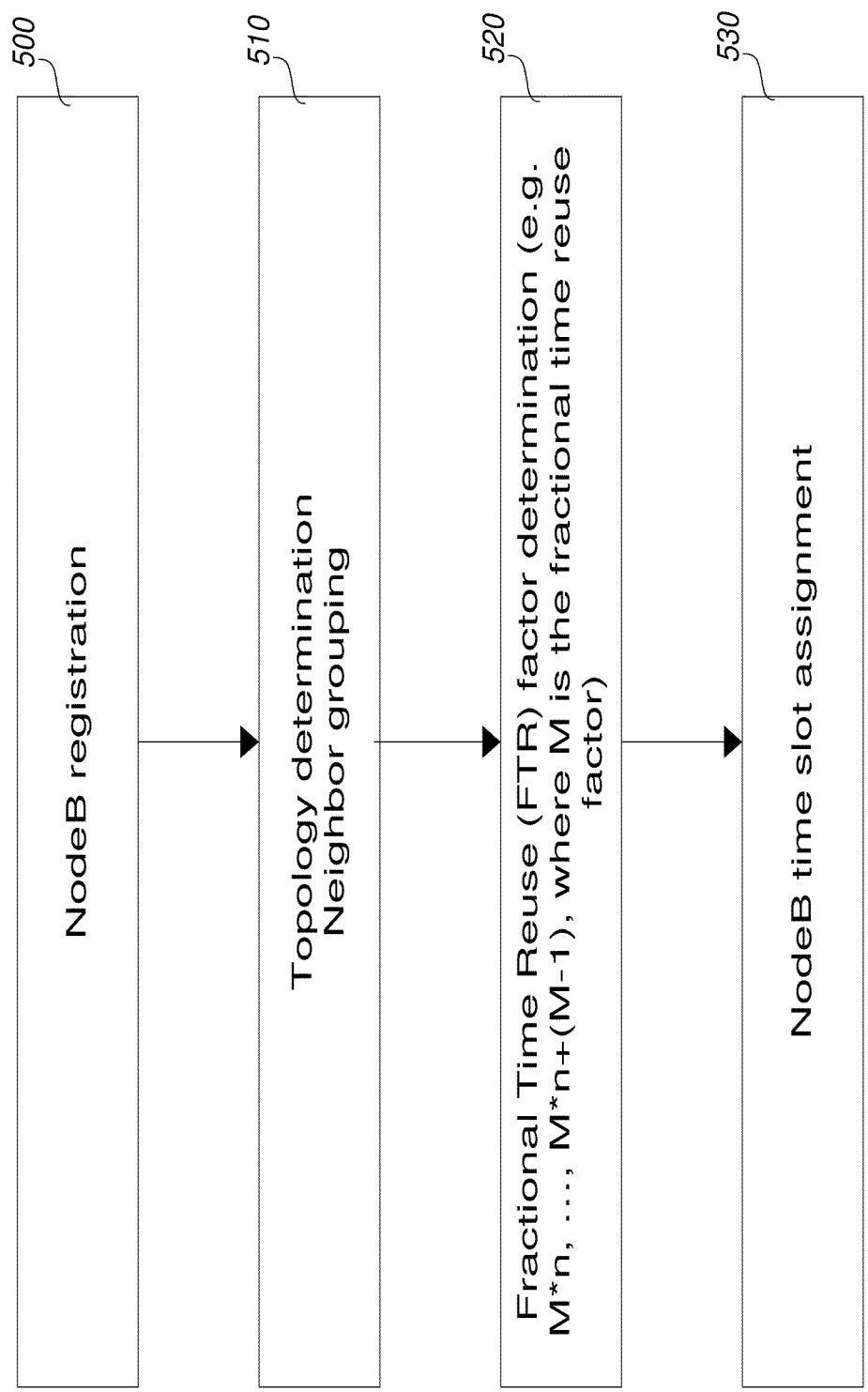
FIG. 5 illustrates Network Procedures for FTR.

Referring to FIG. 5 there is illustrated network procedures for a FTR SON. The process of NodeB registration 500 begins with determining the topology of the neighbor group 510. The number of cells in the group determines the Fractional Time Reuse Fractor, M 520 and the NodeB time slot assignment M*n, . . . , M*n+(M−1) 530.

Figure 6:
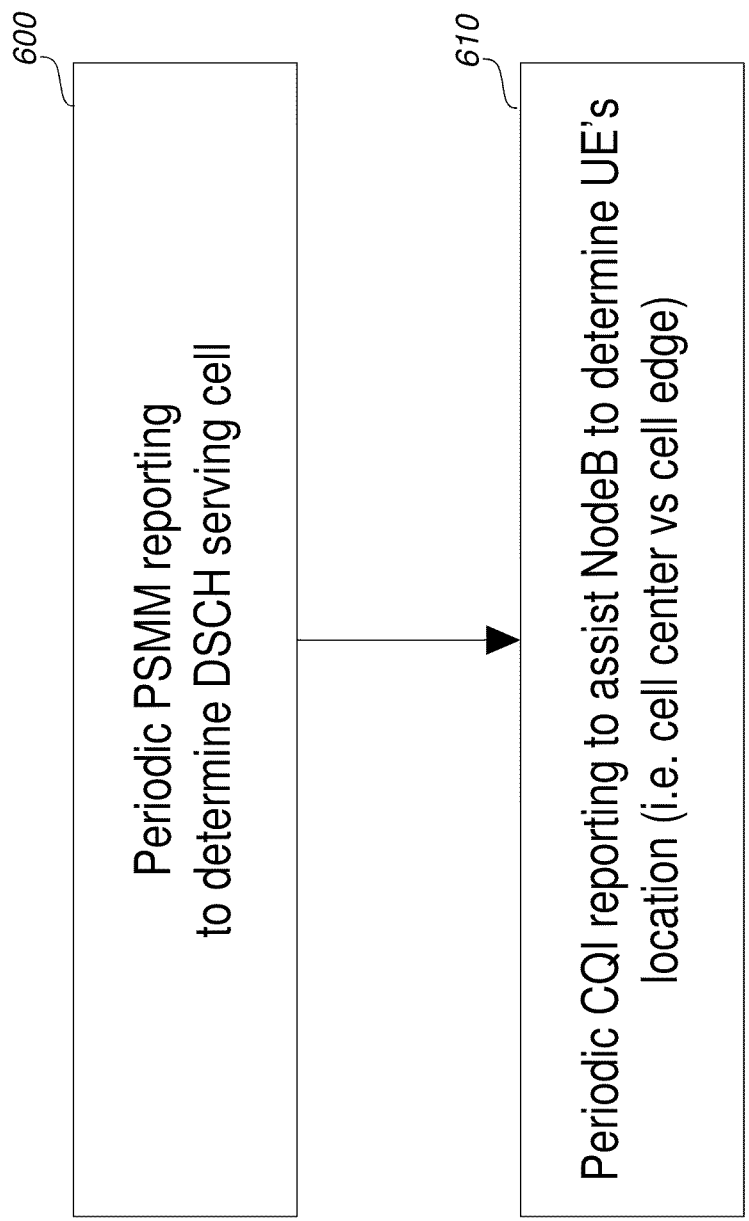
FIG. 6 illustrates UE procedures for FTR.

Referring to FIG. 6 there is illustrated UE procedures for an embodiment of FTR SON. Each UE periodically reports a Pilot Strength Measurement Message (PSMM) to determine a DSCH serving cell 600. Once the serving cell is determined, UE periodically reports 610 CQI to assist NodeB to determine UE's location (i.e., cell center vs cell edge).

Figure 7:
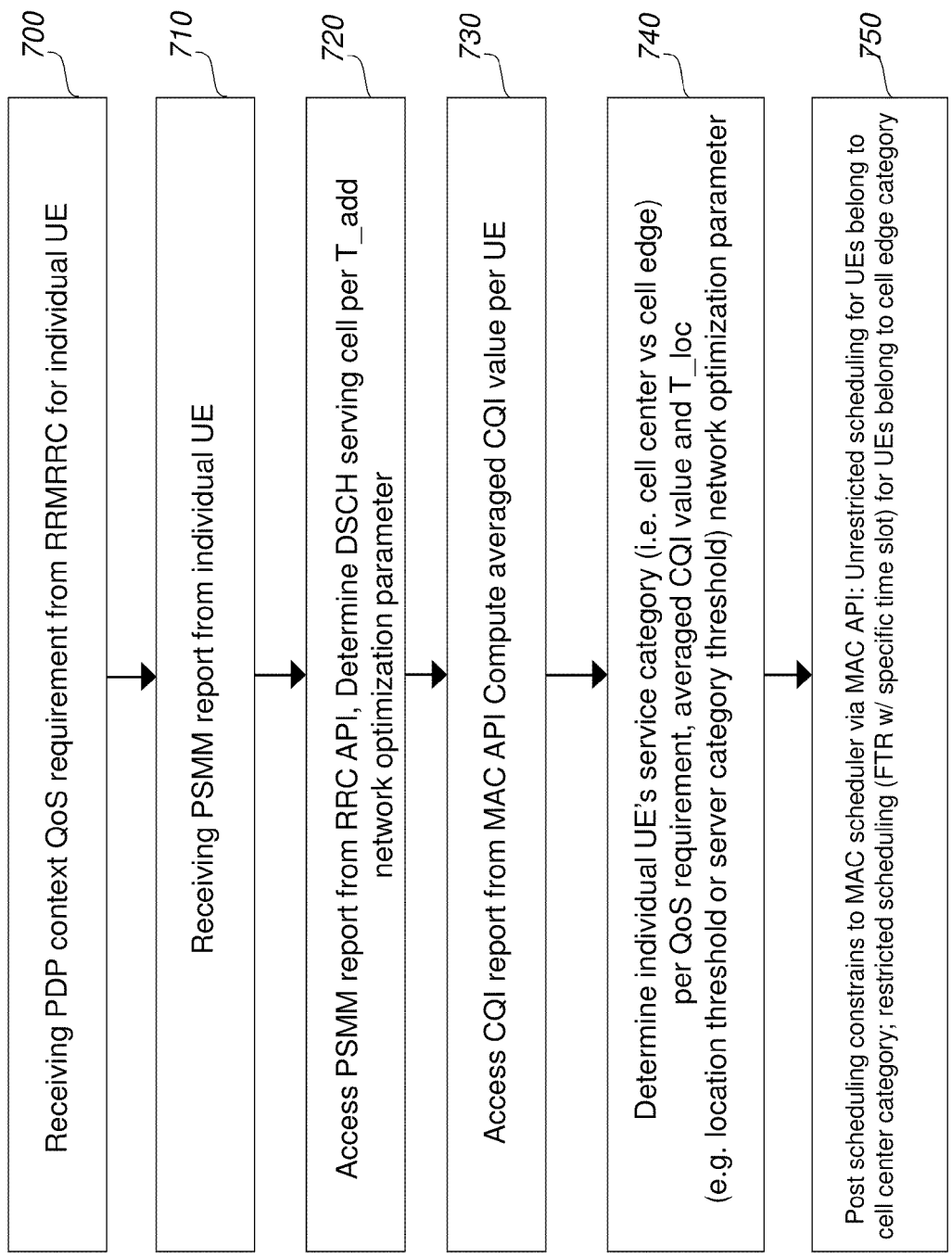
FIG. 7 illustrates NoteB procedures for FTR.

Referring to FIG. 7 there is illustrated NodeB procedures for an embodiment of FTR SON. Each NodeB receives 700 a QoS requirement when a PDP context is configured/reconfigured for each individual UE and 710 a PSMM report from each individual UE via accessing 720 PSMM report from RRC API to determine DSCH serving cell per T-add network optimization parameter. After serving cell determination, NodeB receiving CQI report from individual UE via accessing 730 CQI report from MAC API. NodeB can compute the averaged CQI over a configurable time interval in combination of QoS requirement to determine each UE's location 740 (i.e., cell center vs cell edge). Finally, scheduling constrains to MAC scheduler is posted 750 via MAC API: unrestricted scheduling for UEs belonging to cell center category while restricted scheduling (FTR with specific time slot) for UEs belong to cell edge category.

Having now fully described the inventive subject matter, it will be appreciated by those skilled in the art that the same can be performed within a wide range of equivalent modifications, variations and adaptations without departing from the scope patent disclosure.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

What is claimed is:

1. A method of configuring a self organizing wireless network (SON) comprising the steps of:
    determining a fractional time reuse (FTR) factor based on a number of transmission nodes having an overlapping coverage area;
    determining long-term scheduling restrictions based on the FTR factor for scheduling transmission time intervals (TTIs) of each of the transmission nodes, the long-term scheduling assigning a unique subset of TTIs to each of the transmission nodes so that transmissions according to different long term scheduling restrictions are staggered in time; and
    assigning each of the determined long-term scheduling restrictions to a respective one of the transmission nodes for use in scheduling the transmission times of user equipments (UEs) served by the transmission nodes on any of the transmission frequencies used by the transmission nodes;
    wherein the long-term scheduling restrictions of the transmission nodes are enforced for UEs classified to be at an edge of a transmission node's coverage area; and
    wherein the long-term scheduling restrictions of the transmission nodes are not enforced for UEs classified to be at a center of a transmission node's coverage area.

2. The method of claim 1, wherein each of the registered transmission nodes grouped together based on the overlapping coverage area are identified by consecutive positive integers.

3. The method of claim 1, wherein each of the transmission nodes grouped together based on the overlapping coverage area are identified by consecutive positive integers.

4. The method of claim 3, wherein each of the long-term scheduling restrictions schedules a TTI according to:
$$TTI_{ni}=Mn+i$$
where:
    $TTI_{ni}$ is the $n^{th}$ TTI for the $i^{th}$ transmission node; and
    i is the integer identifying the transmission node.

5. The method of claim 1, further comprising classifying a UE as one of:
    a cell center UE; and
    a cell edge UE.

6. The method of claim 5, wherein the classifying the UE is based upon at least one of QoS requirement, geometry, periodic PSMM and CQI reports.

7. The method of claim 1, wherein each TTI is approximately 1 ms to 2 ms in length.

8. A system for configuring a self organizing wireless network (SON) comprising:
    a component for determining a fractional time reuse (FTR) factor based on a number of transmission nodes having an overlapping coverage area;
    a component for determining long-term scheduling restrictions based on the FTR factor for scheduling transmission time intervals (TTIs) of each of the transmission nodes, the long-term scheduling assigning a unique subset of TTIs to each of the transmission nodes so that transmissions according to different long term scheduling restrictions are staggered in time; and a component for assigning each of the determined long-term scheduling restrictions to a respective one of the transmission nodes for use in scheduling the transmission times of user equipments (UEs) served by the transmission nodes on any of the available frequencies;

wherein the long-term scheduling restrictions of the transmission nodes are enforced for UEs classified to be at an edge of a transmission node's coverage area; and wherein the long-term scheduling restrictions of the transmission nodes are not enforced for UEs classified to be at a center of a transmission node's coverage area.

9. The system of claim 8, wherein each of the transmission nodes grouped together based on the overlapping coverage area are identified by consecutive positive integers.

10. The system of claim 9, wherein the FTR factor is equal to the number of transmission nodes having the overlapping coverage area.

11. The system of claim 10, wherein each of the long-term scheduling restrictions schedules a TTI according to:

$$TTI_{ni} = Mn + i$$

where:

$TTI_{ni}$ is the $n^{th}$ TTI for the $i^{th}$ transmission node; and i is the integer identifying the transmission node.

12. The system of claim 8, further comprising a component for classifying a UE as one of:

a cell center UE; and a cell edge UE.

13. The system of claim 12, wherein the classifying the UE is based upon at least one of QoS requirement, geometry, periodic PSMM and CQI reports.

14. The system of claim 8, wherein each TTI is approximately 1 ms to 2 ms in length.

\* \* \* \* \*